E. A. TRACY.
PAVING BLOCK.
APPLICATION FILED JUNE 17, 1911.
1,017,706.
Patented Feb. 20, 1912.
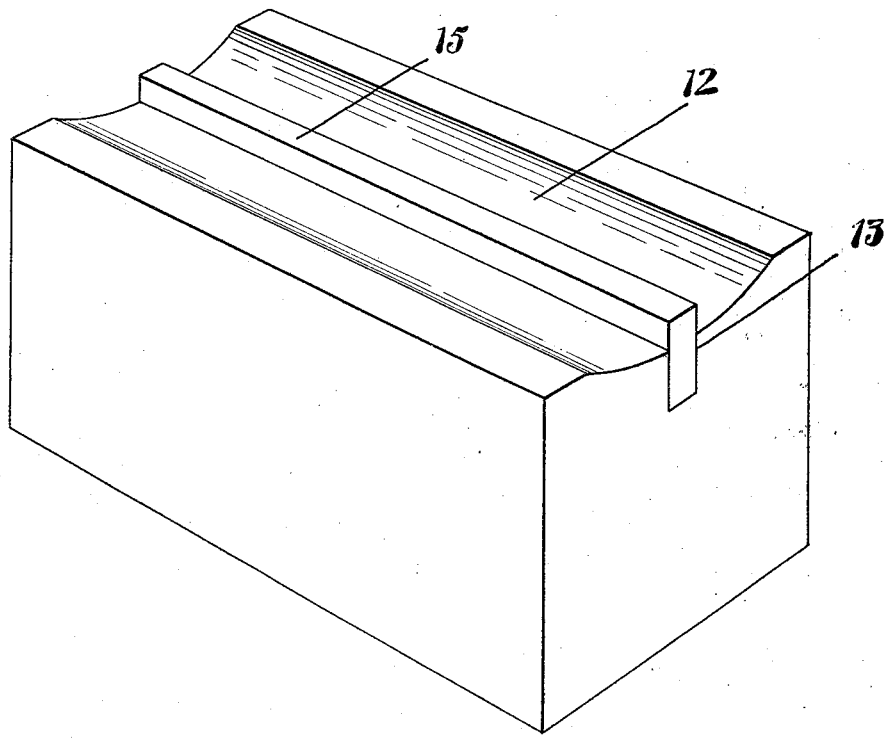
Witnesses;
J. L. O'Neill
H. B. Davis
Inventor;
Edward A. Tracy.
By Noyes & Harriman.
Attys.

UNITED STATES PATENT OFFICE.

EDWARD A. TRACY, OF BOSTON, MASSACHUSETTS.

PAVING-BLOCK.

1,017,706.  Specification of Letters Patent.  Patented Feb. 20, 1912.

Application filed June 17, 1911. Serial No. 633,697.

*To all whom it may concern:*

Be it known that I, EDWARD A. TRACY, a citizen of the United States, residing in Boston, in the county of Suffolk and State of Massachusetts, have invented an Improvement in Paving-Blocks, of which the following is a specification.

This invention relates to paving-blocks, and has for its object to construct a paving-block having a longitudinally extended grid set in its tread-face, the upper edge portion of which is exposed and projects sufficently to be engaged by the calks of horse-shoes, yet does not project above the plane of the tread-face so as to form a projection above the street level.

In the present embodiment of my invention the grid consists essentially of a flat bar or strip of iron or other suitable material, and the block is composed of wood or other suitable material, and the tread-face of the block is formed with a semicircular or other shaped recess extending from end to end thereof, said recess having a kerf at the middle extending from end to end of it, and the grid is securely set in said kerf with its upper edge portion projecting therefrom and occupying a position in said recess, yet terminating approximately in the plane of the tread-face of the block.

The drawing represents a perspective view of the paving-block embodying this invention.

The block is of suitable shape and dimensions, as may be required to serve as a paving-block, and is usually composed of wood, which is treated by any suitable process, or it may be composed of other suitable material. The tread-face of the block is formed with a semicircular or other shaped recess or groove 12 extending from end to end thereof, or thereabout, which is made quite wide, as compared with the width of the tread-face of the block, and of a depth dependent upon the distance it is desired the upper edge portion of the grid shall be exposed. Said recess has a kerf 13 formed in it, at the bottom, approximately at the middle, which extends from end to end of it, or thereabout, and which is adapted to receive the grid.

15 represents the grid which is made as a flat bar or strip, of a thickness approximately equaling the width of the kerf, so as to be driven edgewise into the kerf for the purpose of securing it in place; and of a length approximately equaling the length of the kerf; and of a depth approximately equaling the combined depths of the recess and kerf, so that when driven into the kerf and bottoming therein its upper edge portion will project from the kerf and occupy a position in the recess, yet will not project above the plane of the tread-face of the block, or at least, not unduly.

By providing the tread-face of the block with the recess here shown and described, the upper edge portion of the grid is sufficiently exposed to be engaged by the calks of horse-shoes, but will not extend above the plane of the tread-face of the block and form an objectionable projection above the street level. The width of the recess is only such as to receive the calks of horse-shoes at each side of the grid, the idea being to utilize or cut away as little of the tread-face of the block as possible. Furthermore, said recess provides pockets at each side of the grid for the accumulation of some grit, which will aid in preventing the horses from slipping. Furthermore, the water which enters said recesses at opposite sides of the grid will flow toward the street gutters, and will also cause the grid to rust itself in place, and thereby become securely held.

I claim:—

As a new article of manufacture, the paving-block herein described, composed of a block having a recess in its tread-face extending longitudinally with respect thereto, and a longitudinal kerf arranged in and medially disposed with respect to said recess, and a grid arranged in said kerf, the upper edge portion of which projects therefrom and occupies a position in the recess and terminates approximately in the plane of the tread-face of the block.

In testimony whereof, I have signed my name to this specification in the presence of two subscribing witnesses.

EDWARD A. TRACY.

Witnesses:
B. J. NOYES,
H. B. DAVIS.

Copies of this patent may be obtained for five cents each, by addressing the "Commissioner of Patents, Washington, D. C."